Sept. 19, 1933.  W. QUALEY ET AL  1,927,446
VEHICLE WHEEL
Filed Nov. 21, 1930  2 Sheets-Sheet 1
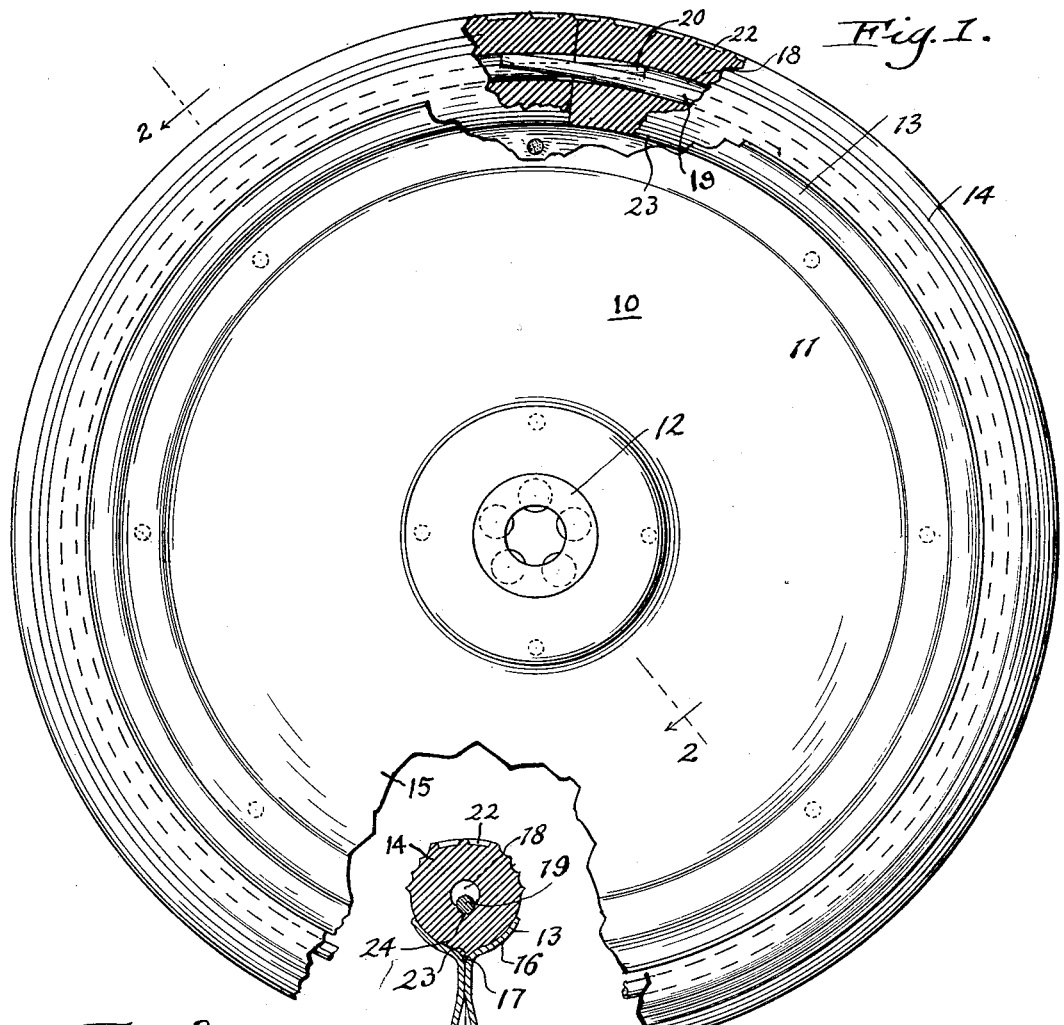
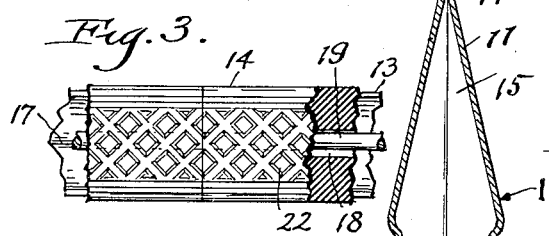
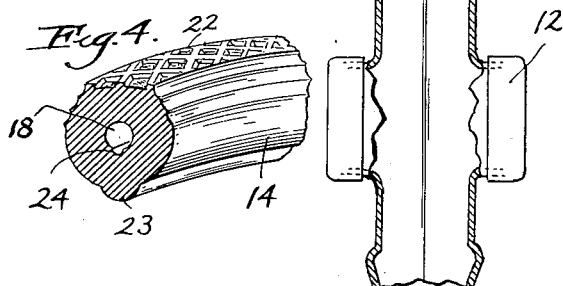

Sept. 19, 1933. W. QUALEY ET AL 1,927,446
VEHICLE WHEEL
Filed Nov. 21, 1930 2 Sheets-Sheet 2

Inventors.
Walter Qualey.
Ralph H. Pyrrell
Knox Hudson & Kent
attys.

Patented Sept. 19, 1933

1,927,446

UNITED STATES PATENT OFFICE 1,927,446

VEHICLE WHEEL

Walter Qualey, Cincinnati, and Ralph H. Tyrrell, Cleveland, Ohio, assignors to The Ohio Rubber Company, Cleveland, Ohio, a corporation of Ohio Application November 21, 1930
Serial No. 497,182

7 Claims. (Cl. 152—6)

This invention relates generally to wheel constructions, and more particularly to vehicle wheels of the type having resilient tire means mounted upon the rims thereof.

In the construction of resiliently tired wheels, such as are used on toy vehicles, or the like, it has been customary to wrap a section or length of hollow extruded tire strip around the rim, so as to extend circumferentially within the channel or annular recess of the latter, and to secure the tire thus formed within the channel by means of wire which has been inserted into the hollow passage of the tire strip. The wire is usually placed under tension by drawing the ends thereof toward each other and securing the same together as by twisting or welding. The action of the wire is to draw the tire into, and hold it in, the channel of the rim, with the ends of the tire strip in abutting relation and enclosing and concealing the joined ends of the wire.

Heretofore during the operation of wrapping the tire strip about the rim the inherent resiliency of the strip has caused it to twist, and when the strip is provided with a tread surface, such twisting deflects the tread surface out of the plane of the wheel, and also makes difficult, if not impossible, the abutting of the ends of the tire strip, so as to bring the tread thereof into proper registration or alignment. A tired wheel in which the tread portion of the tire is twisted or deflected out of its proper plane, is not only of unsalable appearance, but is inefficient and unsatisfactory in use.

It is, therefore, an object of this invention to provide a resiliently tired wheel having novel means for centering the tire on the rim.

Another object of this invention is to provide a wheel of the type having resilient tire means, wrapped around a rim, in which interengaging means on the tire and rim is utilized to hold the tire means with the center line of its tread portion substantially in the plane of the wheel.

Another object of this invention is to provide a wheel of the type mentioned, in which hollow tire means having securing means extending therewithin, is provided with means for centering the securing means with respect to the plane of the wheel.

Still another object of this invention is to provide a wheel of the type mentioned, in which cooperating means on the tire and rim prevents twisting of the tire, and in which means is provided for holding securing means, extending within the tire, substantially in alignment with said cooperating means.

A further object of this invention is to provide a novel form of resilient tire means.

Other objects and advantages of our invention will be apparent from the following description, taken in conjunction with the accompanying sheets of drawings in which, Fig. 1 is a side elevation of a vehicle wheel constructed according to our invention.

Fig. 2 is a transverse sectional view taken on the line 2—2 of Fig. 1.

Fig. 3 is a partial plan view of the wheel of Fig. 1 showing the abutting ends of the tire strip.

Fig. 4 is a sectional perspective view of the resilient tire means.

Figure 5:
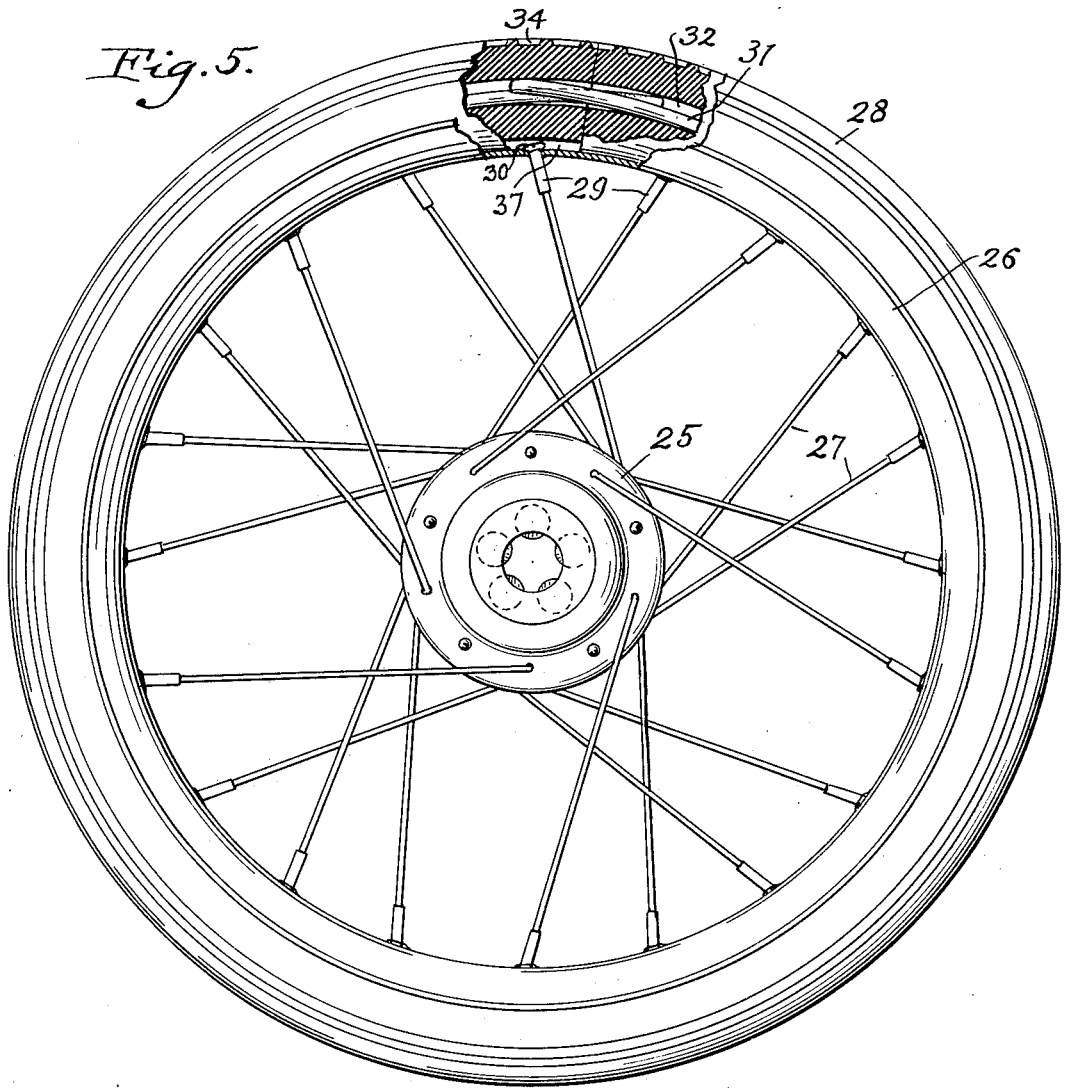
Fig. 5 is a side elevation of another vehicle wheel constructed according to our invention.

In the drawings, to which detailed reference will now be made, we have shown vehicle wheels having resilient tire means, such as are suitable for use on toys and for other purposes. A wheel of this type, having resilient tire means, is, of course, not new in itself, but when constructed according to our invention, however, such a vehicle wheel embodies novel means for holding the resilient tire means against twisting, so that the tread portion is centered and properly positioned with its center line substantially in the plane of the wheel.

In Fig. 1 we have shown our invention embodied in a wheel 10 which is of the type commonly known as a disk wheel. This wheel comprises a disk portion 11, provided with hub and rim portions 12 and 13, and a resilient tire 14 which is mounted in the annular recess or channel of the rim portion. The disk portion of the wheel is constructed by assembling circular disk members 15 which have been dished, or otherwise appropriately shaped, as by suitable stamping operations. In assembling these disk members they are arranged in a well-known manner with their concave surfaces in adjacent relation, as shown in Fig. 2, and are secured together by suitable welding or riveting operations. Oppositely bent flange portions 16, which extend around the outer edges of the circular disks, form the channel-shaped rim portion 13 when the disk members have been secured together. It will be noted that at the junction of the flange portions of the disk members an annular crevice or groove 17 is formed, which, as will be more fully disclosed hereinafter, cooperates with the resilient tire means for centering and holding the latter in proper position.

The resilient tire means 14 of the wheel is formed by wrapping a section or length of tire strip around the rim, so as to lie in the channel or annular recess thereof. The tire strip is preferably a strip of extruded rubber having a hollow longitudinal passage 18, which increases the resiliency of the tire, and which receives the wire 19 for securing the tire to the rim. This wire, as shown in Fig. 1 of the drawings, extends through the passage of the tire strip and has its overlapping end portions 20 secured together, so as to maintain the wire normally under tension for pressing or holding the tire in the channel of the rim.

In assembling the tire upon the rim the ends of the wire extending through the passage of the tire strip are drawn towards each other, in a well known manner by suitable apparatus, and are secured together as by means of twisting or welding. After the ends of the wire have been thus secured together the tire strip is subjected to blows which cause the ends of the tire strip to telescope over the joined ends of the wire and to abut against each other, thus completely concealing and enclosing the wire.

The resilient tire strip, as already stated, is preferably constructed as a strip of extruded rubber which is cut into sections of appropriate length for wrapping around the tire rims. As clearly shown in Fig. 4 of the drawings, this tire strip is provided along one side thereof with a tread portion or surface 22, which may be formed with a suitable pattern or configuration, such as the mesh design illustrated. As a means for centering the tread portion with respect to the center line of the wheel, when the tire strip is wrapped around the rim, we provide the tire strip with an integral longitudinal bead or rib 23, which extends along the side thereof opposite the tread portion 22, for cooperation with the annular groove or crevice 17 of the rim. In forming the tire strip the wall of the hollow passage 18 extending therethrough, is provided with a longitudinal groove 24, which groove is positioned directly above the bead 23, so as to lie substantially in a plane which passes through the center line of the bead 23 and the center line of the tread portion 22. When the securing wire extending through the hollow passage 18 is placed under tension, to press the tire strip into the channel of the rim, this wire is drawn or forced into the groove 24, and the opposed shoulders formed by the side walls of the groove center and position the wire directly above the bead 23.

It will now be readily seen from the arrangement just described that when the tire strip is wrapped around the rim, so as to lie in the annular channel thereof, and the wire extending through the passage of the tire strip is placed under tension, the bead 23 of the tire strip is wedged into the annular crevice or groove 17 of the rim. At the same time the wire wedges itself into the groove 24 and is retained by this groove in the plane of the wheel, or in other words, in the plane which passes through the crevice 17 and the center line of the tread portion. The bead 23 upon being wedged into the crevice 17 conforms to the shape of the crevice and holds the tire against twisting within the annular recess of the rim, thus holding the tread portion of the tire in position for most efficient tractive service. The engagement of the wire in the groove 24 not only prevents lateral displacement of the wire within the passage 18, which might tend to cause twisting of the tire, but also holds the wire in the plane of the wheel, so that the force exerted by the wire will be directly in line with the bead 23.

Figure 6:
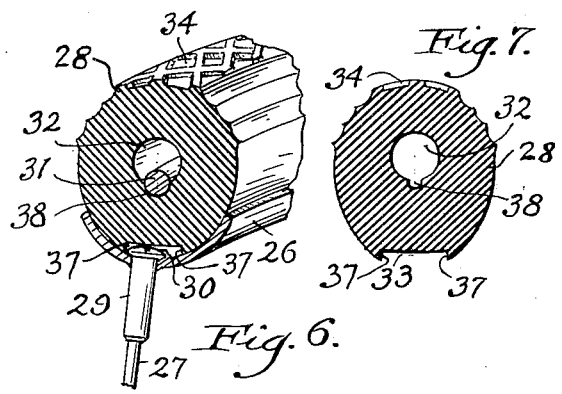
Fig. 6 is a perspective view of a section thereof.
Figure 7:
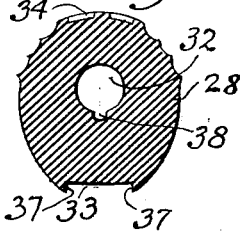
Fig. 7 is a cross-section of the tire.
Figure 8:
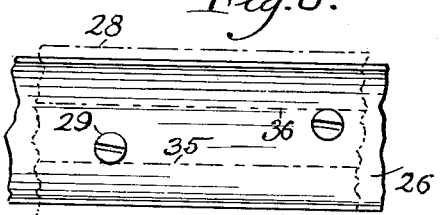
Fig. 8 is a plan view showing a section of the wheel of Fig. 5 with the outline of the tire indicated in dotted lines.

In Figure 5 of the drawings we have shown another vehicle wheel which embodies our invention and which is of the type commonly known as a wire wheel. This wheel comprises hub and rim portions 25 and 26 secured together by wire spokes 27, and a resilient tire 28 mounted upon the rim. The rim portion, as shown in Fig. 6, is preferably channel-shaped so as to provide an annular recess to receive the tire, and is provided with spaced perforations through which the threaded sleeves 29 extend for securing the outer ends of the spokes to the rim. The perforations for the spoke securing members or sleeves 29 are not arranged in a straight line, but, as is common in spoke wheels, are arranged in staggered relation, as indicated in Fig. 8. The spoke securing sleeves 29 are of well known construction, having head portions 30 which, according to our invention, are not countersunk into the inner surface of the rim, but project or extend into the annular recess thereof and cooperate with the tire, as will be explained more fully hereinafter, to prevent twisting of the latter.

The tire is formed by wrapping a section of resilient tire strip around the rim and securing the same in place by means of a wire 31 extending through the passage 32 of the tire, in the manner already described in detail in connection with Fig. 1 of the drawings. The tire strip in this instance, however, is of slightly different cross-sectional shape from the tire strip illustrated in Fig. 4. When the tire strip is for use upon wire wheels it is provided with a longitudinal recess or groove 33 extending along the side thereof opposite the tread portion 34. This groove or recess is made of a width which is greater than the diameter of the head portion of a single securing sleeve 29, but corresponds in width with the spacing of planes, represented by the broken lines 35 and 36 shown in Fig. 8, which are tangent to the opposite edges of the heads of the securing sleeves. In other words, the groove 33 is made of a width such that the spaced shoulders 37 formed by its side walls will engage the opposite sides of the heads of the securing sleeves when the tire is mounted in the recess of the rim, as indicated by the dotted lines shown in Fig. 8.

For centering and holding the securing wire 31 in the plane of the wheel, or in other words, in the plane which extends through the center line of the groove 33 and the center line of the tread portion, we provide the wall of the hollow passage 32 of the tire strip with a longitudinal groove 38 located directly above the center line of the recess 33. When the tire strip is wrapped around the rim and the securing wire 31 is placed under tension, this wire wedges itself into the groove 38, and is retained thereby in the plane of the wheel so that in pressing the tire into the channel of the rim it exerts its force in a direct radial line and does not tend to twist the tire. The action of this securing wire in pressing the tire into the rim causes the opposed shoulders 37 of the recess 33 to be brought into engagement with the heads of the spoke securing sleeves, so as to automatically center and effectively lock the tire against twisting in either direction relative to the rim.

Although we have illustrated only two forms of our novel wheel construction and only two forms of our novel tire strip, we believe, however, that these illustrations clearly demonstrate the principles of our invention which, obviously, could be embodied in numerous forms of wheel constructions and in numerous shapes and forms of tire strip.

It will now be readily understood that we have not only provided a novel form of wheel construction in which cooperating means of the rim and tire center and hold the latter with its tread portion in proper position, but we have also provided a novel form of resilient tire means. Moreover we have provided novel means for centering and holding the tire strip securing wire so that it will exert its force in a direct radial line and will reduce the tendency for the tire to twist.

The means which we have provided for centering and holding the tire with its tread portion in proper position with respect to the plane of the wheel results in the production of vehicle wheels which are salable and regular in appearance because the tire tread is held in accurate and straight alignment with the rim, and the abutting ends of the tire strip are held in registration with each other so that the tread portion is continuous and is not broken or wavy. Our invention also results in the production of wheels of great uniformity in which the tire is centered on the rim so that its tread portion is in proper position for most efficient tractive service.

While we have illustrated and described the device of our invention in a detailed manner, it should be understood, however, that we do not intend to limit ourselves to the precise arrangements of parts and details of construction shown and described, but regard our invention as including such changes and modifications as do not involve a departure from the spirit of the invention and the scope of the appended claims.

Having thus described our invention, what we claim as new is:

1. In a wheel the combination of a rim having an annular recess, tire means wrapped around said rim and having a hollow chamber extending within the same, said chamber having an annular groove recessed into the wall thereof substantially in that plane of the wheel which includes the axis of the chamber, and means for securing said tire means to the rim extending circumferentially of said chamber and engaging in said groove.

2. In a wheel the combination of a rim, tire means wrapped around said rim having a tread portion, said tire means also having a hollow chamber extending within the same with a groove recessed into the wall of said chamber opposite said tread portion, and securing means normally under tension extending circumferentially within said tire means for retaining the latter on said rim, said securing means being in engagement with said groove and centered thereby with respect to the plane of the wheel whereby the force of said securing means is exerted substantially in the direction of said plane.

3. In a wheel the combination of a rim having an annular channel, tire means wrapped around said rim so as to lie in said recess, said tire means being provided with a hollow chamber therein and a tread portion on its outer periphery, cooperating means on said tire means and rim for centering said tread portion with respect to the plane of the wheel, said chamber having a groove recessed into the wall thereof, and tire securing means engaging in said groove and exerting a force in a direction substantially in alignment with said cooperating means.

4. In a wheel the combination of a rim having an annular recess, tire means wrapped around said rim so as to lie in said recess, said tire means being provided with a hollow chamber therein and a tread portion on its outer periphery, cooperating means on said tire means and rim for preventing displacement of said tread portion relative to the plane of the wheel by twisting of the tire means within said recess, said chamber having a groove recessed into the wall thereof and lying substantially in said plane, and means retaining the tire means in said recess comprising a member extending within said chamber and engaging in said groove, said retaining means being constrained to lie in said plane by its engagement in said groove.

5. Wheel tiring comprising an extruded strip of resilient material having a tread portion and a longitudinal passage adapted to receive a tire securing member, said passage having a groove recessed into the wall thereof in which said tire securing member engages, said groove being disposed substantially in the longitudinal plane passing through the axis of said passage and the center line of said tread.

6. In a wheel the combination of a rim having an annular recess, spoke connecting means projecting into said recess, tire means disposed in the recess of said rim and having a hollow chamber extending within the same, said chamber having an annular groove recessed into the wall thereof substantially in that plane of the wheel which includes the axis of the chamber, and securing means extending within said chamber and engaging in said groove, said tire means having integral spaced shoulder portions thereon in engagement with and straddling said spoke connecting means.

7. In a wheel the combination of a rim having an annular recess, spoke connecting means projecting into said recess, tire means disposed in the recess of said rim and having a hollow chamber extending within the same, said chamber having an annular groove recessed into the wall thereof substantially in that plane of the wheel which includes the axis of the chamber, securing means extending within said chamber and engaging in said groove, said tire means being provided with a tread portion on its outer periphery, and means for maintaining said tread portion centered with respect to the plane of the wheel comprising a second groove in said tire means substantially opposite the tread portion and providing spaced shoulders in engagement with and straddling said spoke connecting means.

WALTER QUALEY.
RALPH H. TYRRELL.